UNITED STATES PATENT OFFICE.

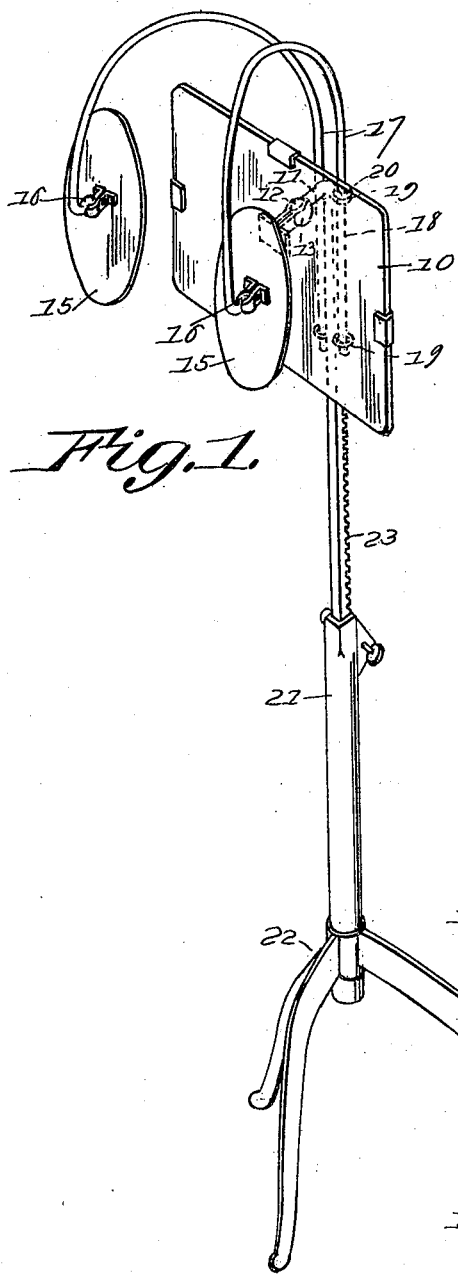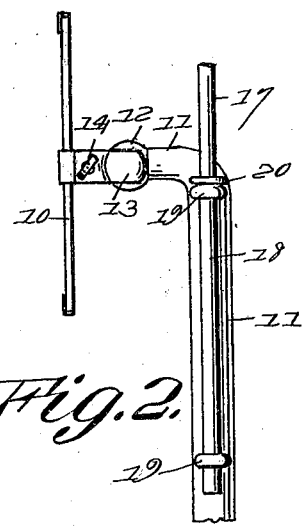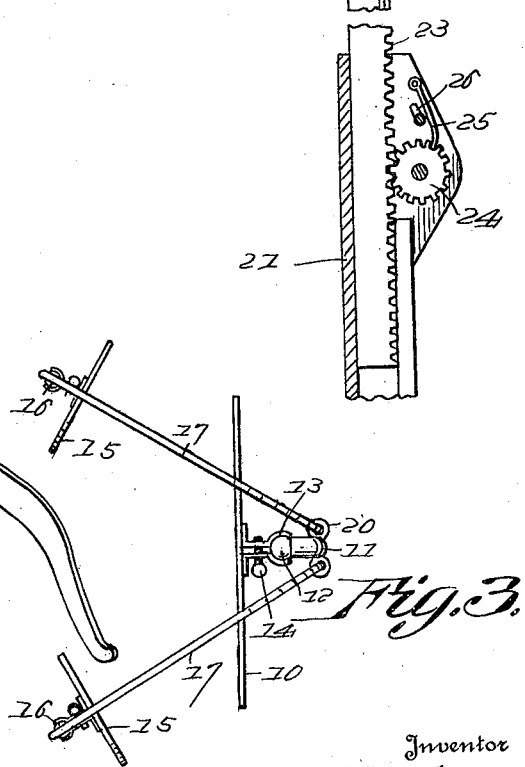

EDWARD V. GERBER, OF LEAVENWORTH, KANSAS.

MULTIPLE LOOKING-GLASS.

1,395,812.　　　　Specification of Letters Patent.　　Patented Nov. 1, 1921.

Application filed March 12, 1921. Serial No. 451,695.

*To all whom it may concern:*

Be it known that EDWARD V. GERBER, a citizen of the United States of America, residing at Leavenworth, in the county of Leavenworth and State of Kansas, has invented new and useful Improvements in Multiple Looking-Glasses, of which the following is a specification.

The object of the invention is to provide a looking glass structure of a type adapted for use as a dressing glass and adapted to afford a view of the observer from all directions so as to facilitate hair dressing and like toilet operations, the fitting and forming of hats, the adjustment and draping of dresses, skirts, etc., and adapted to be arranged either upon a separate and special stand or support or upon any suitable object which may be convenient for the purpose and may be adapted to the convenience of the user; and with this object in view the invention consists in a construction and combination of parts of which a preferred embodiment is shown in the accompanying drawings, wherein:—

Figure 1 is a perspective of an apparatus embodying the invention mounted upon a special stand.

Fig. 2 is a side view partly in section of the same.

Fig. 3 is a plan view thereof.

The device consists essentially of a main or primary mirror 10 universally mounted for angular adjustment upon a standard 11 as by means of a ball and socket joint 12 of which the socket member 13 is provided with an adjusting screw 14 to provide for locking the mirror in its adjusted positions; and one or more supplemental or secondary mirrors 15 universally mounted as by a ball and socket joint 16 upon the extremities of looped or arched crane arms 17 having a swivel bearing upon the standard 11 as by having spindle portions 18 fitted in bearing eyes 19 at opposite sides of said standard and being provided with stop shoulders 20 for limiting the downward movement through the bearing eyes.

The observer by taking a position between the planes of the main or supplemental or secondary mirrors and by varying the angular positions respectively of said mirrors and also the position in a horizontal plane of the secondary mirrors which obviously are capable of swinging movement in arcs described about the spindles 18 as centers, may obtain a complete and comprehensive view from every possible view point as for example in dressing the hair, fitting a waist or draping a skirt, while the hands are left entirely free, and should a variation in the position of the apparatus be desired vertically, it is afforded by mounting the shank in a guide 21 forming a part of a tripod stand 22, and providing said shank with a rack 23 for engagement by a ratchet wheel 24 adapted to be locked with the standard at any desired adjustment by means of a dog 25 which may be disengaged to permit of a change of adjustment of the standard by means of a trip 26.

Having described the invention, what is claimed as new and useful is:—

1. A multiple looking glass having a standard, a main or primary mirror having a universal mounting upon said standard, arched crane arms swiveled upon the standard and extending over the main or primary mirror, and supplemental or secondary mirrors universally mounted upon the extremities of said crane arms.

2. A multiple looking glass having a standard, a main or primary mirror having a universal mounting upon said standard, arched crane arms swiveled upon the standard and extending over the main or primary mirror, and supplemental or secondary mirrors universally mounted upon the extremities of said crane arms, the crane arms having vertical spindle portions to permit of moving the supplemental or secondary mirrors in arcuate paths intersecting the plane of the main or primary mirror.

3. A multiple looking glass having a standard, a main or primary mirror having a universal mounting upon said standard, arched crane arms swiveled upon the standard and extending over the main or primary mirror, and supplemental or secondary mirrors universally mounted upon the extremities of said crane arms and a support or stand upon which the said standard is mounted for vertical adjustment.

In testimony whereof he affixes his signature.

EDWARD V. GERBER.